Oct. 19, 1965          R. J. HESS          3,212,624
VIBRATORY SCREW FEEDER
Filed Nov. 26, 1963                3 Sheets-Sheet 1
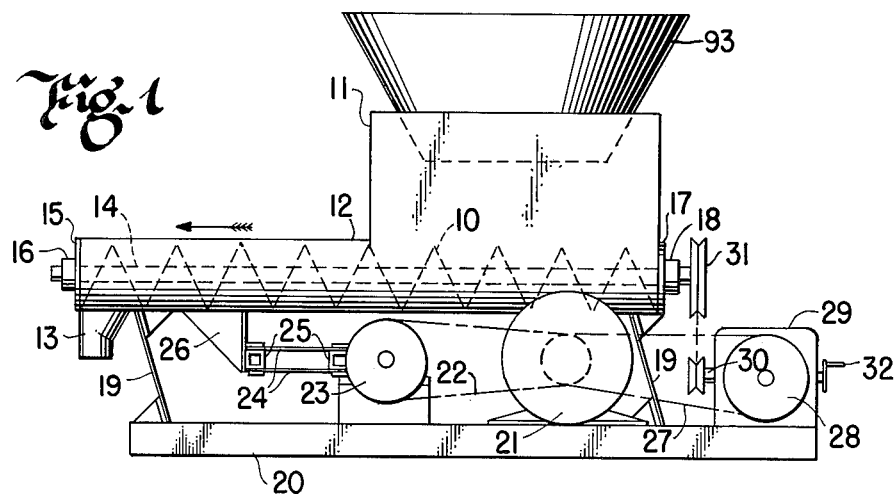
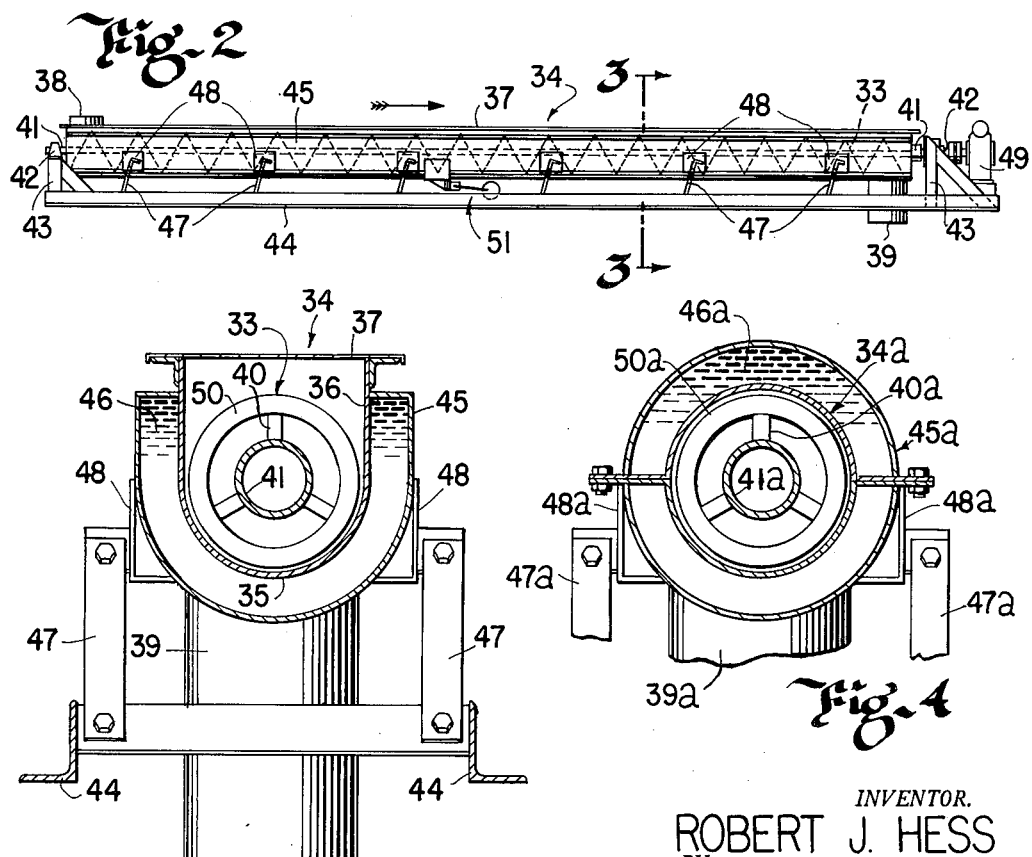
INVENTOR.
ROBERT J. HESS
BY
Marshall, Wilson & Yeasting
attorneys Oct. 19, 1965  R. J. HESS  3,212,624
VIBRATORY SCREW FEEDER
Filed Nov. 26, 1963  3 Sheets-Sheet 2

INVENTOR.
ROBERT J. HESS
BY
Marshall, Wilson & Yeasting
attorneys

Oct. 19, 1965    R. J. HESS    3,212,624
VIBRATORY SCREW FEEDER
Filed Nov. 26, 1963    3 Sheets-Sheet 3

INVENTOR.
ROBERT J. HESS
BY
Marshall, Wilson & Yeasting
attorneys

United States Patent Office 3,212,624
Patented Oct. 19, 1965

3,212,624
VIBRATORY SCREW FEEDER
Robert J. Hess, Jeffersonville, Ind., assignor to Carrier Manufacturing Co., Jeffersonville, Ind., a corporation of Kentucky
Filed Nov. 26, 1963, Ser. No. 325,968
14 Claims. (Cl. 198—64)

This invention relates to an apparatus which transports material and which includes a screw conveyor for carrying material in one direction combined with vibratory means for conveying such material in the opposite direction, the net effect resulting in a very accurate, uniform-density flow of material from the discharge end of the apparatus.

The above apparatus is an improvement upon the apparatus which is disclosed in U.S. application Serial No. 262,604, filed March 4, 1963, now abandoned, in the name of Robert M. Carrier, Jr., such application disclosing a screw conveyor combined with auxiliary mechanism that substantially improves the efficiency of the screw conveyor by forcefully imparting vibratory motion to the material in the screw conveyor which is in addition to and in the same direction as the motion imparted by the screw, whereby the two types of motion are compounded to transport the material. The vibratory screw conveyor disclosed in the above application is useful for conveying materials which do not flow freely, such as fluffy or aeratable powders or gummy materials. The vibratory screw conveyor of the present invention (conveying by vibration opposite to conveying by screw action) is useful when material is very difficult to accurately proportion, such as 300 mesh diatomaceous earth and carbon black. Some materials, particularly those having fine, irregular particles, settle and pack when left standing. These materials become stiff when left standing, but squirt when shaken and then flow easily, i.e., such materials when their stiffness is broken flood or flow in excess of that desired. The vibration conveying action of the vibratory screw conveyor of the present invention keeps the cylinder or tube of the screw conveyor full and produces a pressure that compacts the material (in addition to the vibration itself) resulting in a more accurate, uniform-density flow of material from the discharge end of the screw conveyor as compared to the flow produced by the vibratory screw conveyor of the above application. Both the prior and the vibratory screw conveyor of the present invention are very accurate proportioners and feeders. However, the latter is used when the above materials which are very difficult to accurately proportion are fed, such latter conveyor being more accurate than the prior conveyor when such very difficult materials to accurately proportion are fed. By an accurate feed, it is meant a feed in which a certain weight of material is fed in a certain length of time over and over again within very close limits.

Accordingly, the objects of this invention are to improve feeders and proportioners, to increase the precision of such feeders and proportioners, to provide means for facilitating the flow of powdery or fluffy materials and for regulating the flow as may be desired for subsequent processing operations, and to provide a vibratory screw conveyor in which conveying by vibration is opposite to conveying by screw action, whereby a very accurate, uniform-density flow of material is obtained.

One embodiment of this invention enabling the realization of these objects includes a screw conveyor that comprises an auger, part of which extends through the lower portion of a supply hopper and the remainder of which is surrounded by a cylindrical casing provided with a discharge spout. The screw conveyor, including the supply hopper and the casing, is mounted by means of leaf springs on a base. The leaf springs are inclined slightly to the vertical. Thus, as the leaf springs are flexed, the screw conveyor moves through a substantially linear path which extends at an acute angle to the axis of the auger. The leaf springs are inclined in a direction such that conveying by vibration is opposite to conveying by the auger.

In accordance with the above, one feature of this invention resides in providing a vibration conveying action for the screw conveyor which is opposite in direction to the feeding action of the auger to keep the casing of the screw conveyor full and to provide pressure for compacting the material (in addition to the vibration itself) resulting in a very accurate, uniform-density flow of material out of the discharge spout.

The above and other objects and features of this invention will be appreciated more fully from the following detailed description when read with reference to the accompanying drawings wherein:

FIG. 1 is an elevational view of one form of vibratory screw conveyor according to this invention;

FIG. 2 is an elevational view of a second form of vibratory screw conveyor according to this invention;

FIG. 3 is an enlarged, vertical sectional view taken along the line 3—3 of FIG. 2;

FIG. 4 is a vertical sectional view corresponding to FIG. 3 of a modification;

Figure 5:
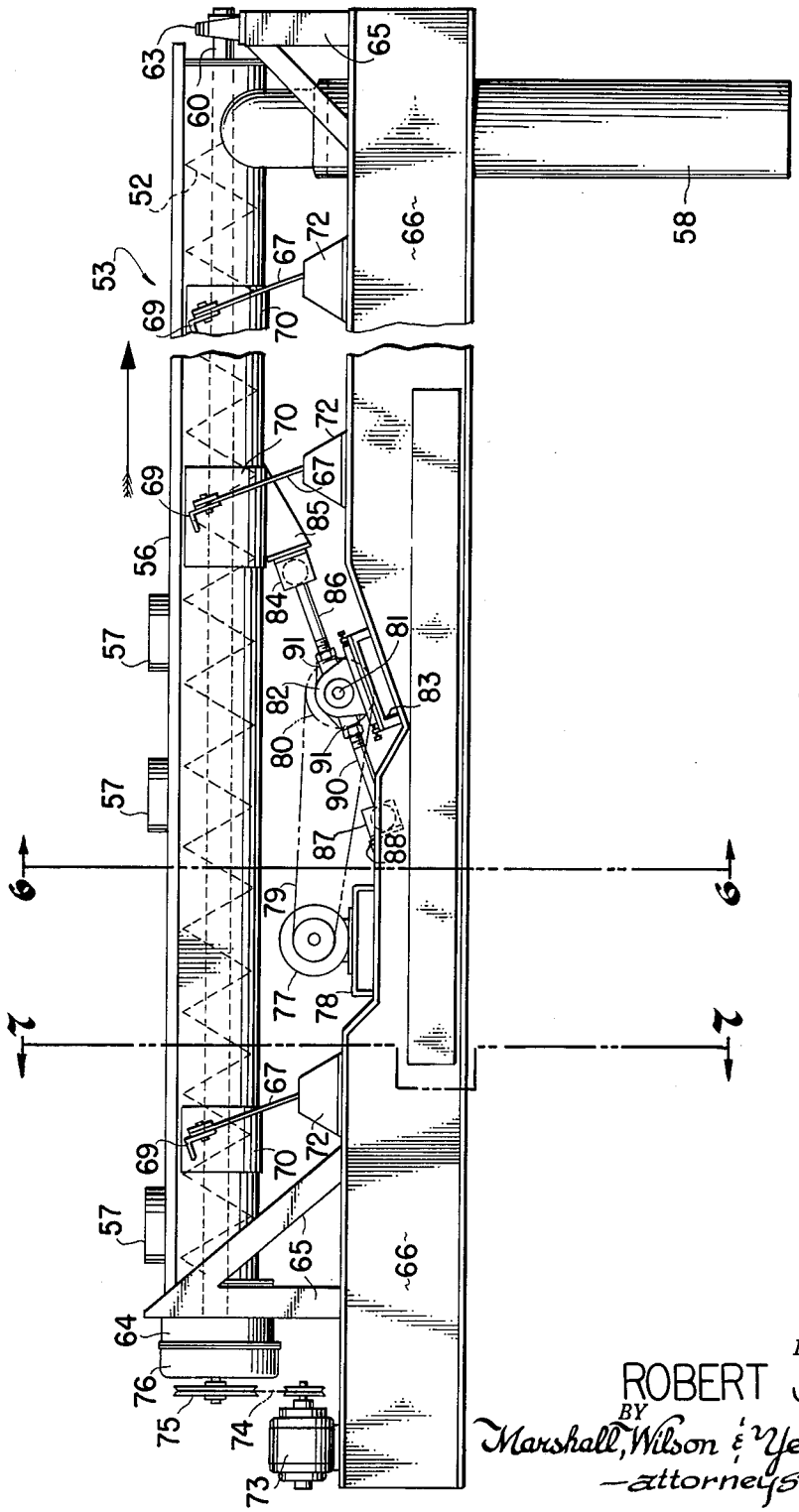
FIG. 5 is an elevational view of a third form of vibratory screw conveyor according to this invention.

Referring to the drawings, the apparatus shown in FIG. 1 includes a screw conveyor that comprises an auger 10, part of which extends through the lower portion of a supply hopper 11 and the remainder of which is surrounded by a cylindrical casing 12. The casing 12 is provided with a spout 13 through which the conveyed material is discharged from the apparatus. Although the spout 13 discharges the material radially downward, it is to be understood that the material may be discharged axially.

A shaft 14 on which the auger 10 is mounted extends through an annular plate 15 that closes the discharge end of the casing 12, and is journaled in a bearing 16 that is secured on the outer side of the annular plate 15. The other end of the shaft 14 extends through a hole which is provided in the end of the supply hopper 11 and is surrounded by a second annular plate 17 secured on the outside of the supply hopper. Mounted on this annular plate is a second bearing 18 for the shaft 14.

The screw conveyor, including the supply hopper 11 and casing 12, is mounted by means of leaf springs 19 on a base 20. These leaf springs, which may be of any suitable spring material, such as steel or laminated glass fiber, are inclined slightly to the vertical. Thus, as the leaf springs 19 are flexed, the screw conveyor moves through a substantially linear patch which extends at an acute angle to the axis of the auger 10. Leaf springs, however, are only one example of a support that mounts the casing 12 for movement in an elongated path.

The auger 10 is turned in a direction such that the conveying direction of the auger is to the left as viewed in FIG. 1 and the direction of inclination of the leaf springs 19 is such that conveying by vibration is to the right as viewed in FIG. 2, the resulting overall feeding action of the vibratory screw conveyor being to the left as indicated by the arrow in FIG. 1.

Power for vibrating the screw conveyor is supplied from a motor 21 mounted on the base 20, through a belt 22 which drives a pulley 23. This pulley operates a conventional rotary eccentric drive, see, for example, the above U.S. application Ser. No. 262,604, which is connected to the bottom of the casing 12 by means of a pair of leaf springs 24 (drive link). The pair of leaf springs 29 is secured at each end to a section of square tubing 25 one of which is welded to a bracket 26 on the bottom of the casing 12. As the rotary eccentric drive is rotated by the motor 21, the drive acts through the drive link to vibrate the screw conveyor in a path determined by the leaf springs 19 that support the screw conveyor.

The motor 21, acting through a belt 27 and a pulley 28, also drives a gear reduction unit 29 having an output shaft 30. In order to provide a rotary drive for rotating the auger in a direction such as to move the material toward the discharge end of the casing 12, the output shaft 30 is provided with a suitable pulley and belt through which it drives a pulley 31 secured to the shaft 14 on which the auger 10 is mounted. In this manner the motor 21 supplies power also for rotating the auger 10.

In order that output of the screw conveyor shown in FIG. 1 may be varied, the gear rdeuction unit 29 is of the variable ratio type and is provided with a hand wheel 32 by means of which the speed of the output shaft 30 may be adjusted. It is to be understood that the gear reduction unit 29, instead of being driven by the motor that furnishes power for the rotary eccentric drive, may be driven by a separate motor. If such separate motor is a variable speed motor, the gear reduction unit 29 may be of the fixed ratio type instead of the variable ratio type.

A chute indicated diagrammatically at 93, which extends into the supply hopper 11, may be kept filled with material to be conveyed. With this arrangement the level of the material in the supply hopper 11 normally will remain substantially at or slightly above the level of the lower end of the chute 93, and the flights of the auger 10 inside the casing 12 will be completely filled with material during the operation of the apparatus.

The backward vibration conveying action of the screw conveyor keeps the casing 12 full and provides back pressure which compacts the material during operation of the apparatus (in addition to the vibration itself) resulting in a very accurate, uniform-density flow of the material from the spout 13.

A modified vibratory screw conveyor is shown in FIGS. 2 and 3 and includes a screw conveyor that comprises a ribbon auger 33 extending through a casing 34 having a rounded bottom 35 (FIG. 3), vertical sides 36 and a flat cover 37. The casing 34 is provided with a feed spout 38 through which material is fed into the vibratory screw conveyor and with a discharge spout 39 through which the conveyed and mixed material is discharged from the apparatus. The ribbon auger 33 is a standard ribbon type having lifting or mixing paddles 40 (FIG. 3) extending radially from and along a pipe auger shaft 41, the auger flight or ribbon 50 of the ribbon auger 33 being carried on the outer ends of the paddles 40.

The shaft 41 on which the mixing paddles 40 and the auger ribbon 50 are mounted extends through closed ends of the casing 34 and is journaled in bearings 42 carried atop framework 43 mounted on a base 44. This mounts the bearings 42 in a stationary manner in contrast to the bearings 16 and 18 (FIG. 1) which are connected through the leaf springs 19 to the base 20. The vertical sides 36 and the rounded bottom 35 of the casing 34 are surrounded by a heating or cooling jacket 45 which contains water 46 that is heated or cooled according to the requirements of the specific installation and circulated by means not shown.

The casing 34 and the water-jacket 45 are supported by means of a plurality of leaf springs 47 (like leaf springs 19— FIG. 1) which have their lower ends secured to the base 44 and have their upper ends secured to side brackets 48 on the jacket 45. Accordingly, the auger 33 is rotatably mounted on the base 44 and a conduit, i.e., casing 34, which surrounds at least the lower portion of the auger is movably mounted on the base independently of the auger, so that the conduit may be vibrated relative to the base while the auger is rotated without being vibrated. As the leaf springs 47 are flexed, the attached casing 34 moves through a substantially linear path which extends at an acute angle to the axis of the auger 33.

The auger 33 is turned in a direction such that conveying direction of the auger is to the right as viewed in FIG. 2 and the direction of inclination of the leaf springs 47 is such that conveying by vibration is to the left as viewed in FIG. 2, the resulting overall feeding action of the vibratory screw conveyor being to the right as indicated by the arrow in FIG. 2.

Power for rotating the auger 33 is supplied from a motor 49 which is mounted on the base 44 and is operatively connected to the auger shaft 41. Power for vibrating the casing 34 and the jacket 45 is supplied from a vibratory drive 51 which may be like the vibratory drive shown in FIG. 1.

The vibratory screw conveyor shown in FIG. 2 is used to handle material, such as wood cellulose fibers, at a controlled temperature. All of the material discharged from this conveyor has had immediate conact with the water-jacketed trough, the material passing through the open-work of the auger ribbon 50 and being mixed by the paddles 40. There is no problem of the core of the material being a temperature different from that of the peripheral material (looking at the material in cross section) because the core material can never discharge without moving out against the water-jacketed trough. In addition to conveying (backward conveying) the vibratory action fluidizes the material, keeping it in constant motion and, hence, more acceptable to heat transfer (surface area of the most minute particle is exposed to the adjacent material for conduction or the connvection air within the unit). The backward vibration conveying action of the screw conveyor keeps the casing 34 full and provides back pressure which compacts the material during operation of the apparatus resulting in a very accurate, uniform-density flow of the mixed material from the spout 39.

A modified vibratory screw conveyor is shown in FIG. 4 and is the same as the form of apparatus shown in FIGS. 2 and 3, except that the casing 34a and the water-jacket 45a are cylindrical in shape. Similar reference numerals in FIGS. 2–3 and FIG. 4 refer to parts which are similar in structure and in function.

The springs 19 (FIG. 1), the springs 47 (FIGS. 2 and 3) and the springs 47a (FIG. 4) are adjusted or selected for stiffness so that they cooperate with the mass of the respective conveyors to form vibratory systems having natural frequencies at the desired operating speeds. The motion which the rotary eccentric drive tends to impart to a particle of material in the apparatus is illustrated in FIG. 4 in the above U.S. application Ser. No. 262,604. This motion in the apparatus of the present invention so far described consists of a succession of jumps or surges away from the discharge end of the apparatus, the sense of rotation of the auger being such that the auger tends to move the material in the opposite direction. The apparatus shown in FIGS. 1–4 has a definite vibratory stroke which is determined by the eccentricity of the rotary eccentric drive. Preferably the rotary eccentric drive is operated at a relatively low speed so as to make it possible to employ a relatively long vibratory stroke, ranging from 3/16 inch to 1 inch. For example, the apparatus may be vibrated with a stroke of ½ inch at a frequency as high as 900 cycles per minute or as low as 400 cycles per minute. A large conveyor embodying the invention may be vibrated with a stroke of 1 inch at a frequency as high as 600 cycles per minute or as low as 300 cycles per minute.

Figure 7:
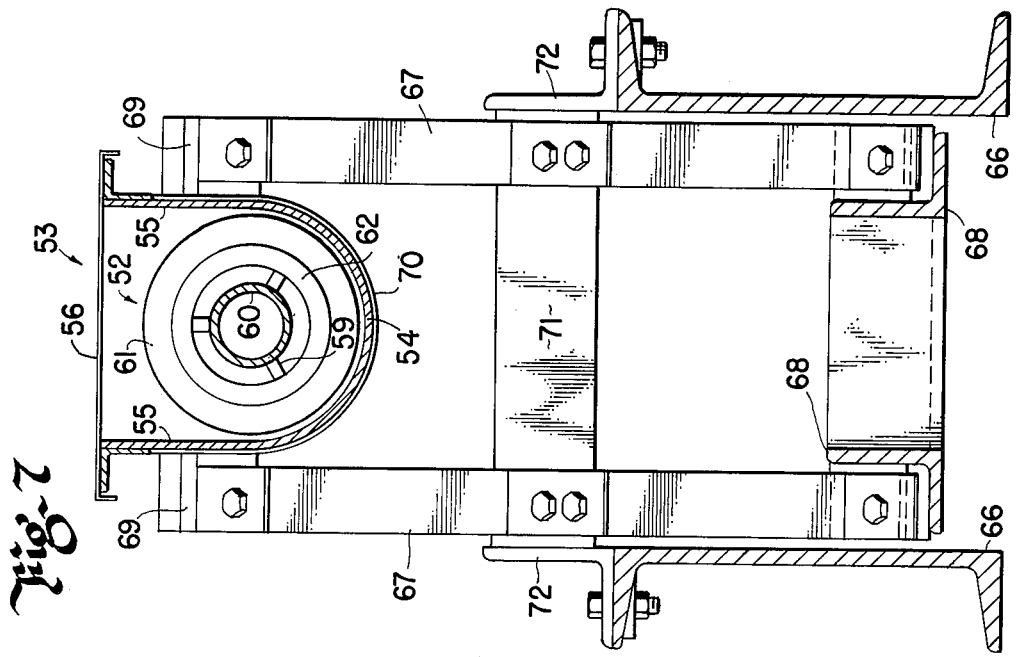
FIG. 7 is an enlarged, fragmentary, vertical sectional view taken along the line 7—7 of FIG. 5.
Figure 6:
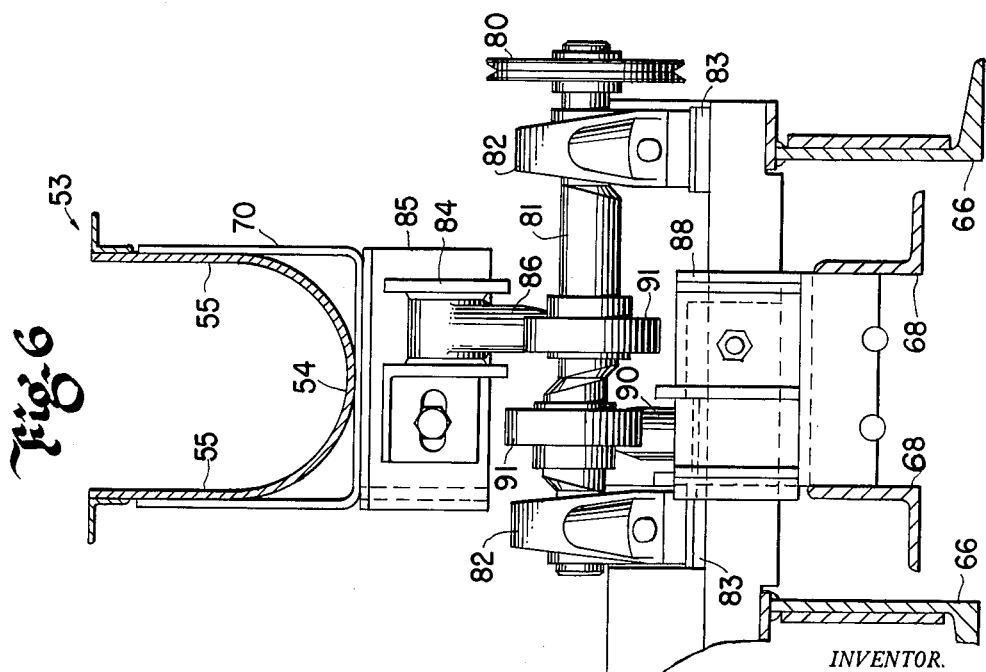
FIG. 6 is an enlarged, fragmentary, vertical sectional view taken along the line 6—6 of FIG. 5.

Another modified vibratory screw conveyor is shown in FIGS. 5–7 and includes a screw conveyor that comprises a standard double ribbon mixing type auger 52 extending through a casing 53 having a rounded bottom 54 (FIGS. 6 and 7), vertical sides 55 and a flat cover 56. The casing 53 is provided with three feed spouts 57 through which material is fed into the vibratory screw conveyor and with a discharge spout 58 through which the conveyed and mixed material is discharged from the apparatus. The ribbon auger 52 has lifting or mixing paddles 59 (FIG. 7) extending radially from and along a standard pipe auger shaft 60, the outside auger flight or ribbon 61 being left hand and carried by the inside auger flight or ribbon 62 which is right hand and which is carried on the outer ends of the paddles 59. As shown in FIG. 7, the auger ribbons are concentric.

The shaft 60 on which the mixing paddles 59 and the auger ribbons 61 and 62 are mounted extends through closed ends of the casing 53 and is journaled in a bearing 63 at its right end as viewed in FIG. 5 and in a bearing 64 at its left end, the bearings being carried by framework 65 erected on a base 66. This mounts the bearings in a stationary manner.

The casing 53 is supported by means of a plurality of leaf springs 67 which have their lower ends secured, through hangers, to a pair of angle irons 68, which comprise a counterbalance of an identical weight as the casing 53, and have their upper ends secured to side brackets 69 on three large brackets 70 wrapped around and secured to the sides and bottom of the casing 53. All of the brackets 70 are shown in FIG. 5, the middle one having a flat-bottomed U shape as shown in FIG. 6 and the end ones of the brackets 70 having a round-bottomed U shape as shown in FIG. 7. The leaf springs 67 are secured at their center portions to hangers 71 (FIG. 7) which extend transversely of the base 66 between brackets 72 (FIGS. 5 and 7) atop the base 66. This arrangement produces a balanced vibratory conveyor. Accordingly, the auger 52 is rotatably mounted on the base 66 and a conduit, i.e., casing 53, which surrounds at least the lower portion of the auger is movably mounted on the base independently of the auger, so that the conduit may be vibrated relative to the base while the auger is rotated without being vibrated. As the leaf springs 67 are flexed, the attached casing 53 moves through a substantially linear path which extends at an acute angle to the axis of the auger 52.

The direction of inclination of the leaf springs 67 is such that conveying by vibration is to the right as viewed in FIG. 5, i.e., conveying by vibration is toward the discharge spout 58 in contrast to conveying by vibration away from the discharge spout as shown in FIGS. 1–4. However, since the auger 52 includes both left and right hand ribbons 61 and 62, the vibratory conveying action is in a direction opposite to the screw feeding action of one of the ribbons. The resulting overall feeding action of the vibratory screw conveyor is to the right as indicated by the arrow in FIG. 5. Accordingly, in each of the species (FIG. 1—one species, FIGS. 2 and 3—second species, FIG. 4—third species, and FIGS. 5–7—fourth species) a screw conveyor which carries material in one direction is combined with vibratory means for conveying such material in the opposite direction, the net effect resulting in a very accurate, uniform-density flow of material from the discharge end of the apparatus. The springs 67 are adjusted or selected for stiffness as described above in connection with FIGS. 1–4, the theory of the motion imparted to the particles by the vibratory feed is as referred to hereinbefore, and the speed and length of stroke of the vibratory drive hereinafter described preferably is as described above in connection with FIGS. 1–4.

Power for rotating the auger 52 is supplied from a motor 73 mounted on the base 66, through a belt 74 which drives a pulley 75. This pulley drives a shaft-mounted speed reducer 76 which rotates the auger shaft 60 at sixty r.p.m. when the input to the speed reducer is 1750 r.p.m.

Power for vibrating the casing 53 is supplied from a motor 77 carried on a motor base 78 mounted on the base 66, through a belt 79 which drives a pulley 80. This pulley is fixed to a rotary driving member consisting of an eccentric shaft 81 which is journaled in a pair of bearing blocks 82 each carried on a bearing base 83 supported from the base 66. The eccentric shaft 81 is connected to a drive lug 84, mounted on a bracket 85 carried by the middle one of the three brackets 70 as viewed in FIG. 5, by means of a drive arm 86. The eccentric shaft 81 is connected to a drive lug 87, mounted on a bracket 88 carried by the two angle irons 68, by means of a drive arm 90. Bearings 91 on the eccentric shaft 81 operatively connect the ececntric shaft to the drive arms 86 and 90. As the eccentric shaft 81 is rotated by the motor 77, the eccentric drive acts through the bearings 91 and drive arms 86 and 90, respectively, to vibrate the casing 53 in a path determined by the leaf springs 67 that support the casing 53 and to drive the counterbalance (angle irons 68). The rotary eccentric drive may be replaced by various other ececntric drives. Many types of rotary eccentric drives for generating vibrations are known.

It is to be understood that the above description is illustrative of this invention and that various modifications thereof can be utilized without departing from its spirit and scope.

Having described the invention, I claim:

1. A feeder comprising, in combination, an auger mounted for rotation, a movably mounted conduit surrounding and closely spaced from at least the lower portion of the auger along at least part of the length of the auger, means for vibrating the conduit to convey material therealong in one direction, and means for rotating the auger to convey the material along the conduit in the opposite direction, resulting in an accurate, uniform-density discharge-flow of the material.

2. A feeder according to claim 1 wherein means are provided for so mounting the auger for rotation that the auger is rotatable without being vibrated when the conduit is vibrated.

3. A feeder according to claim 1 wherein means are provided for so mounting the auger for rotation that the auger is vibrated when the conduit is vibrated.

4. Apparatus for transporting material comprising, in combination, a screw conveyor for conveying the material in one direction, and vibratory means operatively connected to the conveyor for conveying the material in the opposite direction, the net conveying effect resulting in a uniform-density flow of the material in one of said directions.

5. A feeder comprising, in combination, an auger mounted for rotation and having its axis at an angle to the vertical, a movably mounted conduit surrounding and closely spaced from at least the lower portion of the auger along at least part of the length of the auger, the conduit defining charge and discharge openings, means for vibrating the conduit to convey material therealong away from the discharge opening, and means for rotating the auger to convey the material along the conduit toward the discharge opening, resulting in an accurate, uniform-density flow of the material from the discharge opening.

6. A feeder according to claim 5 wherein a heat transfer-jacket surrounds at least the lower portion of the conduit along at least part of the length of the conduit, the jacket and the conduit being movable together as one.

7. A feeder according to claim 6 wherein the auger is a ribbon mixing auger which permits the material to contact the jacketed conduit.

8. A feeder according to claim 5 wherein the conduit is cylindrical and a cylindrical heat transfer-jacket surrounds at least a portion of the length of the conduit, the jacket and the conduit being movable together as one.

9. A feeder according to claim 8 wherein the auger is a ribbon mixing auger which permits the material to contact the jacketed conduit.

10. A feeder comprising, in combination, an auger mounted for rotation and having its axis at an angle to the vertical, a movably mounted conduit surrounding and closely spaced from at least the lower portion of the auger along at least part of the length of the auger, the conduit defining charge and discharge openings, means for vibrating the conduit to convey material therealong toward the discharge opening, and means for rotating the auger to convey the material along the conduit away from the discharge opening, resulting in an accurate, uniform-density flow of the material from the discharge opening.

11. A feeder according to claim 10 wherein means are provided for so mounting the auger for rotation that the auger is rotatable without being vibrated when the conduit is vibrated.

12. A feeder according to claim 10 wherein the auger includes two concentric ribbons of opposite hand one of which conveys the material along the conduit away from the discharge opening in opposition to the vibratory feed and the other of which conveys the material along the conduit toward the discharge opening to aid the vibratory feed, resulting in an accurate, uniform-density flow of the material from the discharge opening.

13. A feeder according to claim 10 wherein the means for vibrating includes a rotary driving eccentric shaft.

14. Apparatus for transporting material comprising, in combination, a screw conveyor defining a discharge opening and including a double ribbon mixing type auger mounted for rotation for conveying material toward and away from the discharge opening, whereby the material is mixed, and vibratory means operatively connected to the conveyor for conveying the material toward the discharge opening, the net conveying effect resulting in an accurate flow of the material from the discharge opening.

References Cited by the Examiner

UNITED STATES PATENTS

| | | | |
|---|---|---|---|
| 2,228,840 | 1/41 | Mittendorf | 198—64 X |
| 2,765,899 | 10/56 | Ballard | 198—64 |
| 2,800,252 | 7/57 | Wahl | 198—64 X |
| 2,858,011 | 10/58 | Wahl | 198—64 |

SAMUEL F. COLEMAN, *Primary Examiner.*